3,142,988
PRESSURE SENSING APPARATUS
Robert G. Love, Duncan, Okla., assignor to Halliburton Company, Duncan, Okla., a corporation of Delaware
Filed Oct. 10, 1960, Ser. No. 61,491
2 Claims. (Cl. 73—388)

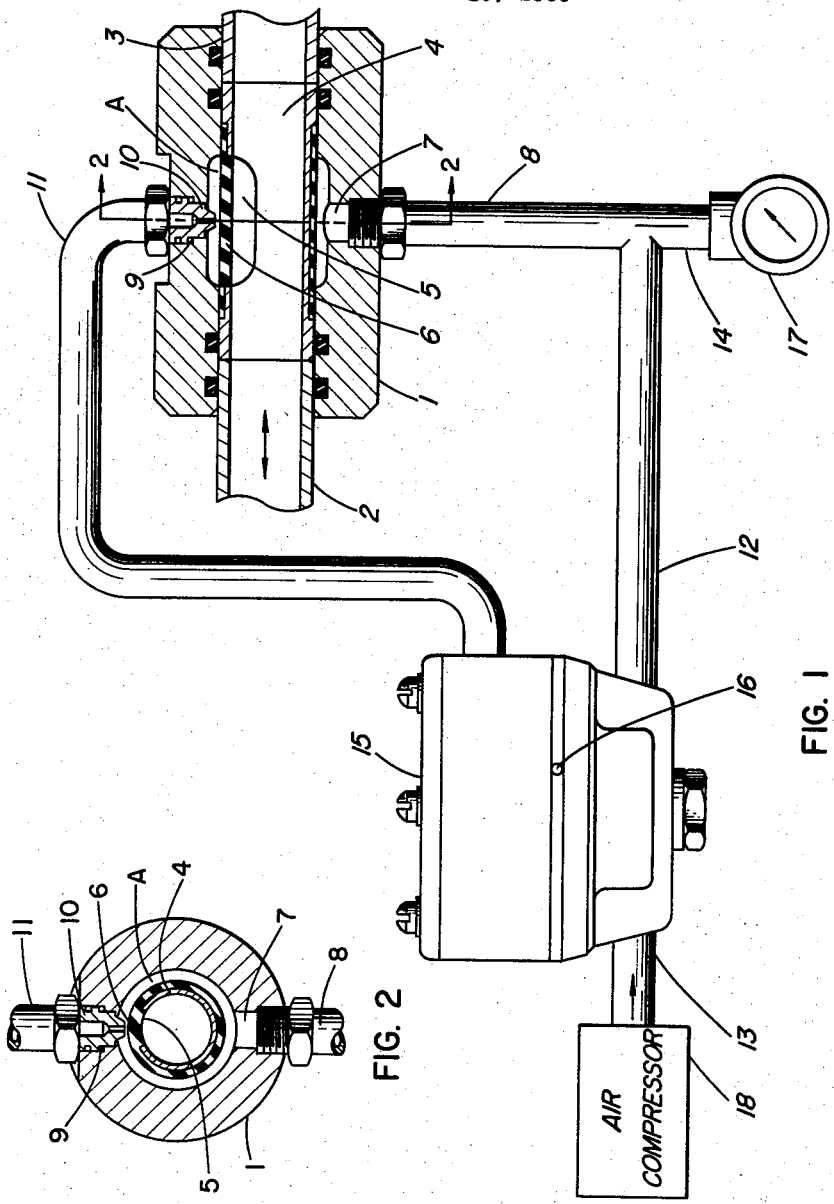

This invention relates generally to apparatus for determining the pressure of fluid in a pipe or the like. More particularly, it relates to pressure sensing apparatus which is suitable for use in a null-balance pressure determining system.

Null-balance systems for determining pressures have, in the past, proved generally satisfactory. One such system is described in detail by C. B. Moore in a paper entitled "The Solution of Instrumentation Problem by the Pneumatic Null Balance Method," appearing at pages 598–603 of the September 1945 issue of Instruments magazine. That disclosure is hereby made a part of this application.

The type of sensing element or pressure tap used in such systems have, for the most part, been of the flat diaphragm type. The flat diaphragm type has proved satisfactory where either the pressure of a static fluid is to be determined or where the fluid container is of relatively larger diameter.

Recently, however, situations have been encountered where it is necessary to determine the pressure of fluid flowing in pipes of relatively small diameter. In some of these situations, the pressure of fluids such as cement slurries or other materials which tend to harden or settle out in any irregularities in the pipe, must be determined. Obviously, a flat diaphragm installed in the pipe, particularly if the pipe diameter is small, will create irregularities. It follows then that erroneous results are obtained due to the settling out or hardening of the foreign materials about the diaphragm of the pressure tap.

Certain other situations, such as where the viscosity of the fluid was to be determined, have been encountered wherein laminar flow of the fluid in the pipe must be maintained. In these situations, no irregularities can be tolerated that would cause turbulent flow in the pipe.

It is therefore one object of this invention to provide improved pressure sensing apparatus for use in determining the pressure of fluid in a pipe or the like.

Another object of the invention is to provide an improved pressure tap having a continuous uninterrupted surface exposed to the pressure medium suitable for use with pneumatic null-balance systems.

This invention provides a pressure sensing device or pressure tap which includes a body member having a fluid passageway therein exposed to the fluid of which the pressure is to be determined. An element of resilient material is provided which is disposed along at least a portion of the wall of the passageway separating the passageway from a chamber formed in the body member. Some means, such as the nozzle of the null-balance system, is provided to sense the deflection of the resilient element when pressure is applied thereto. Suitable instrumentation may be provided if desired to indicate directly the pressure of the fluid in the pipe.

The foregoing and additional objects and advantages of the invention will become more apparent when read in conjunction with the following description wherein similar characters refer to similar parts in all views and wherein:

FIGURE 1 illustrates partly in schematic and partly in cross section a pressure tap constructed in accordance with the invention installed in a pneumatic null-balance system.

FIGURE 2 is a cross-sectional view of the pressure tap taken along line 2—2 of FIGURE 1.

Referring first to FIGURE 1, shown therein is a pressure tap constructed in accordance with the invention connected in a pneumatic null-balance system. The pressure tap includes a body member 1 which is connected between pipe sections designated 2 and 3.

A tube 4 is located in a bore extending through the body member 1 between pipe sections 2 and 3 thus affording a continuous fluid passageway therethrough. A portion of the side wall of the tube 4 has been removed forming a lateral opening 5 therein. A sleeve 6 of resilient material encircles a portion of and is bonded to the tube 4. The sleeve 6 is arranged whereby it provides a smooth and continuous interior surface with the interior of the tube 4, completely filling the lateral opening 5. The resilient material used should be compatible with the fluid flowing therethrough and should be of a type that exhibits no hysteresis. The preferred material is a natural or synthetic rubber compound although many others may be used.

A portion of the interior of the body member 1 has been relieved thus providing a chamber A when the tube 4 is installed therein. The chamber A is located adjacent the sleeve 6 of resilient material, and the thickened portion of the sleeve 6 which fills the lateral opening 5 constitutes a diaphragm. The chamber A is at least sufficient in size to contain the covered opening 5 in the tube 4. As shown in FIGURE 2, the chamber A completely encircles the tube 4, but this is not necessary to the operation of the device.

A nozzle 10 is located in a port 9 which extends through the wall of the body member 1 into chamber A. The outlet of the nozzle 10 is positioned adjacent the resilient diaphragm and at the approximate center of the covered opening 5 in the tube 4. The inlet of the nozzle 10 is connected to an air supply pipe 11 which is connected to a conventional air booster pilot 15. The pilot 15 has a vent 16.

A partially threaded port 7 extends through the wall of the body member 1 providing for communication with the chamber A. A pipe section 8 is threaded into the port 7. Connected to the pipe section 8 are pipe sections 12 and 14. Pipe section 12 is connected to the air booster pilot 15 and pipe section 14 is connected to a gage or pressure recording device 17.

A pipe 13 connects the air booster pilot 15 with a conventional source of pressurized air such as an air compressor 18. The air booster pilot 15 is a commercially available device which is used in the preferred combination to further increase the overall accuracy thereof. One type of such device is described in U.S. Patent No. 2,516,333.

In operation, the pressure tap is installed in a system containing fluid under pressure. Air or other suitable fluid is supplied through the pipe 13 to the booster pilot 15. In the booster pilot 15, the air stream is divided into two output streams which have slightly different pressures. The higher pressure stream flows through pipe 11 and nozzle 10 into chamber A. The stream having a slightly lower pressure fills pipe sections 12, 8, and 14. The vent 16 in the booster pilot 15 is associated with the low pressure air stream and permits the escape of a small quantity of air to the atmosphere. The air escaping from the system allows the higher pressure air in the pipe 11 to flow continually through the nozzle 10 into chamber A and through pipe sections 8 and 12 to the vent 16 in the booster pilot 15.

Pressure applied to the fluid in the pipes 2 and 3 and the tube 4 deflects the resilient diaphragm portion of the sleeve 6 covering the opening 5 in the tube 4 outwardly, reducing the clearance between the outlet of the nozzle 10 and the surface of the resilient diaphragm 6. When the clearance is thus reduced, less air can flow from the nozzle 10. This results in a pressure increase in pipe 11 and, due to the arrangement of the air pressure system, in a proportional increase in the air in pipe sections 8, 12, and 14. The pressure increase therein is reflected as an increase in the reading of the pressure read-out instrument 17 which is connected to pipe section 14. The pressure read-out instrument 17 would, of course, be calibrated and have graduations corresponding to the pressure of fluid in the tube 4.

When the pressure increases in pipe section 8 and the chamber A, the resilient diaphragm covering the lateral opening 5 is restored to its initial position. This deflection and restoration of the resilient material occurs almost instantaneously and is so slight that little if any change is effected in the fluid flow passageway in the tube 4.

As may be seen from the foregoing description, a pressure tap constructed in accordance with the invention provides a continuous uninterrupted flow passage. As previously pointed out, this is a very important and necessary feature when it is desired to measure the pressure of a flowing fluid for the purpose of determining the viscosity of the fluid or when handling fluids which tend to harden or settle-out in any irregularities in the system.

It should be be understood that the foregoing description is by way of example only and that many variations and modifications may be made thereto without departing from the spirit of the invention or the scope of the annexed claims.

I claim:

1. In pneumatic, null-balance apparatus for determining the pressure of fluid in a pipe or the like having means for supplying air under pressure and a pressure read-out instrument, the combination of a body member having a bore therethrough connected in said pipe, a tube mounted in a said bore so that its interior is in communication with said pipe, said tube having a lateral opening in one sidewall thereof, a resilient sleeve encircling said tube, said sleeve having a resilient diaphragm filling said opening whereby said sleeve member has a continuous interior surface, said body member having a portion of enlarged diameter in said bore forming a chamber with said tube, said body member also having a pair of spaced-apart ports extending into said chamber, a nozzle mounted in one of said ports, said nozzle having its outlet positioned adjacent the resilient diaphragm filling said opening and having its inlet connected to said air supply, and a pipe connecting the other port with the air supply means and with said read-out instrument.

2. Pressure sensing apparatus, comprising in combination: a body member having a bore, a tube in the bore forming a fluid passageway of constant size, said tube having a lateral opening, a resilient sleeve encircling said tube, said sleeve having a resilient diaphragm filling said lateral opening and having an inner surface flush with the inner surface of the tube, means on the body member cooperating with said sleeve to define an annular chamber therebetween, the chamber having spaced ports, and a fluid discharge nozzle in one of said ports extending into said chamber and having an outlet adjacent said diaphragm.

References Cited in the file of this patent

UNITED STATES PATENTS

| | | |
|---|---|---|
| 1,861,999 | Bowlus | June 7, 1932 |
| 2,915,078 | Ochs | Dec. 1, 1959 |

FOREIGN PATENTS

| | | |
|---|---|---|
| 549,210 | Belgium | July 31, 1956 |

OTHER REFERENCES

Article by Moore, "The Solution of Instrumentation Problems by the Pneumatic Null Balance Method," Instruments (page 600), vol. 18, September 1945.